United States Patent

[11] 3,617,241

| [72] | Inventor | Vaino Eemil Veijola<br>Sammaltie 57, Oulu, Finland |
|---|---|---|
| [21] | Appl. No. | 778,442 |
| [22] | Filed | Nov. 25, 1968 |
| [45] | Patented | Nov. 2, 1971<br>Continuation-in-part of application Ser. No. 524,479, Feb. 2, 1966, now abandoned. |

[54] METHOD FOR PREPARING NITROPHOSPHATE FERTILIZER
2 Claims, 2 Drawing Figs.

[52] U.S. Cl. .................................................. 71/35, 23/102, 71/36, 71/39, 71/43, 71/58, 71/59
[51] Int. Cl. .......................................................... C05b 11/06
[50] Field of Search ................................................ 71/43, 59, 36, 35, 34, 39

[56] References Cited
UNITED STATES PATENTS
3,326,667 6/1967 De Rooij ..................... 71/43 X
3,342,580 9/1967 De Rooij ..................... 71/43 X
3,415,619 12/1968 Young ......................... 23/107

OTHER REFERENCES
Hackh's Chemical Dictionary, Third Edition, 1944- page 720- The Blakiston Co., Philadelphia
Perry et al.- Distillation, Second Edition, 1965- pages 488 & 489- Interscience Publishers, New York
Horsley et al.- Azeotrapic Data- 1952- page 8- American Chemical Society Washington, D.C.

Primary Examiner—Samih N. Zaharna
Assistant Examiner—Bennett H. Levenson
Attorney—Albert M. Parker ABSTRACT: Fertilizers are prepared by dissolving a phosphate mineral in nitric acid, extracting the resulting solution with an organic solvent, neutralizing the solvent or extract phase with ammonia, and using the aqueous salt phase so obtained, which contains mainly ammonium salts of nitric acid and phosphoric acid, as the raw material for nitrophosphate fertilizer. The solvent used in the extraction is recovered by a combination of mechanical separation by settling of azeotropic distillation.

METHOD FOR PREPARING NITROPHOSPHATE FERTILIZER

CROSS-REFERENCE TO RELATED APPLICATION

This application is a continuation-in-part of application Ser. No. 524,479 filed on Feb. 2, 1966, and now abandoned.

The present invention relates to a method of preparing mixed fertilizers starting from a solution obtained by dissolving phosphate mineral in concentrated nitric acid.

DESCRIPTION OF THE PRIOR ART

Of commercially utilized prior art methods for preparing soluble, phosphate-containing mixed fertilizers utilizing nitric acid for conversion of raw phosphate to soluble state, the most important are the so-called ODDA and PEC methods. The PEC method, which derives its name from the French company "Potasse et Engrais Chimique," and which is described in French Pat. No. 973,312 has the limitation that the phosphate thereby produced is in the form of dicalcium phosphate, i.e. in citrate-soluble state. A further disadvantage of the method lies in the fact that the binding of the quantity of calcium that is in excess with reference to the dicalcium phosphate originating in the raw phosphate, in the form of carbonate or sulfate, means that a component of little or no value is included in the product, thus restricting nutrient content increase in the product.

In the ODDA method, named after the Norwegian company "Odda-Smelteverk" which introduced the method and described it in German Pat. Nos. 549,539 and 549,540, a part of the calcium originating in the raw phosphate is removed from the reaction mixture by crystallization as calcium nitrate tetrahydrate. This results for technical reasons even in most favorable cases in a molar proportion of about $Ca:P_2O_5=1.2$. The solubility of the phosphate nutrient in the product is thus in practice limited to the possibility of converting about 50 percent of the same to water-soluble state while the remainder will stay in the so-called citrate-soluble state.

In the U.S. Pat. No. 3,326,667 there is disclosed a method of preparing fertilizer salts by decomposing phosphate rock with concentrated nitric acid, precipitating gypsum from the resultant solution by adding potassium, ammonium or magnesium sulfate, extracting the aqueous solution obtained after removal of the gypsum precipitate with an organic alcohol solvent to form an aqueous phase containing the fertilizer salts and an alcohol phase containing free nitric acid and phosphoric acid, neutralizing the aqueous phase after separation from the alcohol phase and recovering the fertilizer salts from the aqueous phase.

SUMMARY OF THE INVENTION

It is an object of the present invention to provide a method of preparing mixed fertilizers of the nitrophosphate type that are wholly or for the greater part water soluble starting from a solution by dissolving phosphate mineral in concentrated nitric acid and using a liquid-liquid extraction system for the separation of the desired components without the necessity of any precipitating operations. It is a further object of the invention to provide an extraction system that operates with a very high degree of recovery of the solvent used.

The method of the invention comprises dissolving a phosphate mineral containing calcium phosphate in concentrated nitric acid, extracting the solution obtained with an organic solvent, such as butyl alcohol (butanol) or tertiary amyl alcohol (t-AmOH), having limited miscibility and forming an azeotropic mixture with water to form an extracted aqueous phase containing mainly calcium nitrate and an organic extract phase containing mainly free nitric and phosphoric acids, separating said extract phase from said extracted aqueous phase, neutralizing said extract phase to form an organic solvent phase and a salt phase containing water-soluble nitrate and phosphate, separating said salt phase from said solvent phase, evaporating residual organic solvent from said salt phase in the form of an azeotropic mixture, allowing said azeotropic mixture to separate into its components and recirculating the organic solvent so obtained, and processing said salt phase to a mixed fertilizer.

In order to obtain a still more complete recovery of the solvent used, it is advantageous to evaporate residual solvent from the extracted aqueous phase in the form of an azeotropic mixture, to separate the azeotropic mixture into its components and recirculate the solvent so obtained. The extracted aqueous phase may then be processed to a calcium nitrate or calcium ammonium nitrate fertilizer.

DESCRIPTION OF THE PREFERRED EMBODIMENTS

Figure 1:
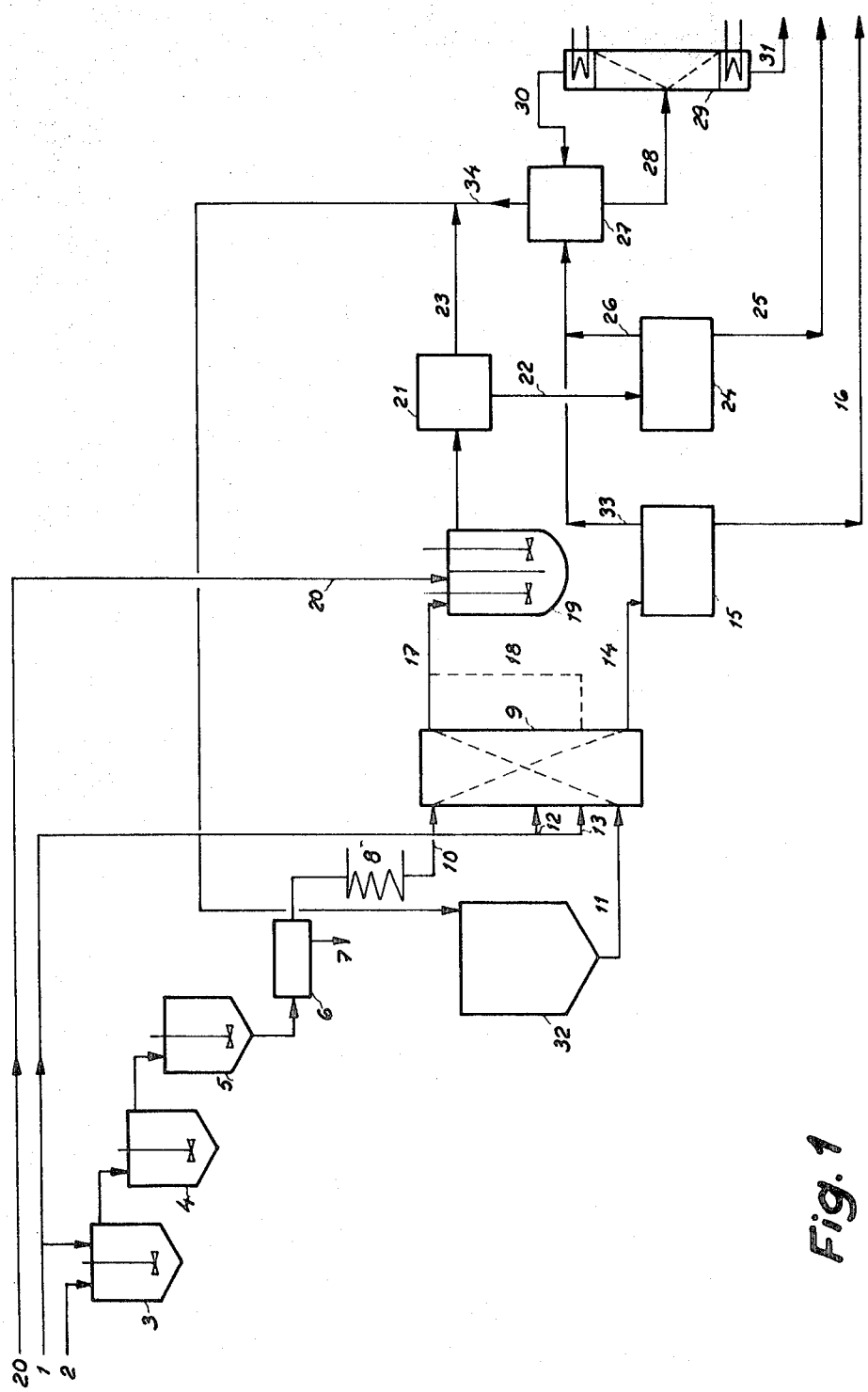
FIG. 1 is a flowsheet illustrating the method of the invention embodying a certain recovery system for the solvent.

The method of the invention will now be described in more detail with reference to FIG. 1.

Raw phosphate 2 is dissolved in concentrated nitric acid 1 in reactors 3, 4, 5. After separation 6 of the insoluble 7 the solution is cooled to the extraction temperature in heat exchanger 8 and fed to multiphase extraction column 9. Extraction solvent 11 is fed to the base of the extraction column. To minimize phosphoric acid combining with calcium thus forming calcium phosphate during the extraction, nitric acid is continuously added to the center 12 and base 13 of the extraction column. The extracted aqueous phase 14, which mainly consists of a water solution of calcium nitrate, is obtained from the base of the extraction column. This solution is fed to an evaporator 15 where the small solvent residues are stripped off as an azeotropic mixture 33 from the calcium nitrate solution. After this the calcium nitrate solution 16 is further processed by evaporating and granulating either directly to calcium nitrate fertilizer or by converting into calcium ammonium nitrate fertilizer.

The organic solvent phase 17, which contains the phosphoric acid and the nitric acid of the solution 10 and also the additional nitric acid 12, 13 added in the extraction column, is obtained from the top of the extraction column 9. This solution is fed to a neutralizing reactor 19. Alternatively a part of the solution can be returned via conduit 18 to the center of the extraction column. In the reactor 19 the acids of the organic solvent phase are neutralized e.g. with gaseous ammonia 20. Two phases are formed: a solvent phase and a salt phase containing the ammonium nitrate and ammonium phosphate which phases are separated in a settling tank 21. The solvent phase is returned via conduit 23 to the solvent reservoir 32. The salt phase is fed via conduit 22 to an evaporator 24 where the solvent residues are stripped off as an azeotropic mixture 26. After the solvent has been stripped off, the salt phase, which is a water solution 25 containing mainly ammonium phosphate and ammonium nitrate, is evaporated and granulated to highly nutritious N-P or, upon addition of a potassium compound, N-P-K fertilizers having nearly 100 percent of their phosphate value in the water-soluble form. The azeotropic distillates 33, 26 obtained from evaporators 15, 24 are combined in a settler 27 and form two phases: an upper solvent phase and a lower aqueous phase. The upper phase is returned via conduit 34 to the main solvent stream 23 and to solvent reservoir 32, and the lower phase is supplied via conduit 28 to a fractionating column 29. In this apparatus the solvent is distilled from the dilute water solution as an azeotropic mixture and discharged from the top of the column via conduit 30 to the settler 27 together with the azeotropes from the evaporators 15, 24. The waste water which contains less than 0.05 percent of solvent is discharged from the base of the distillation column.

Figure 2:
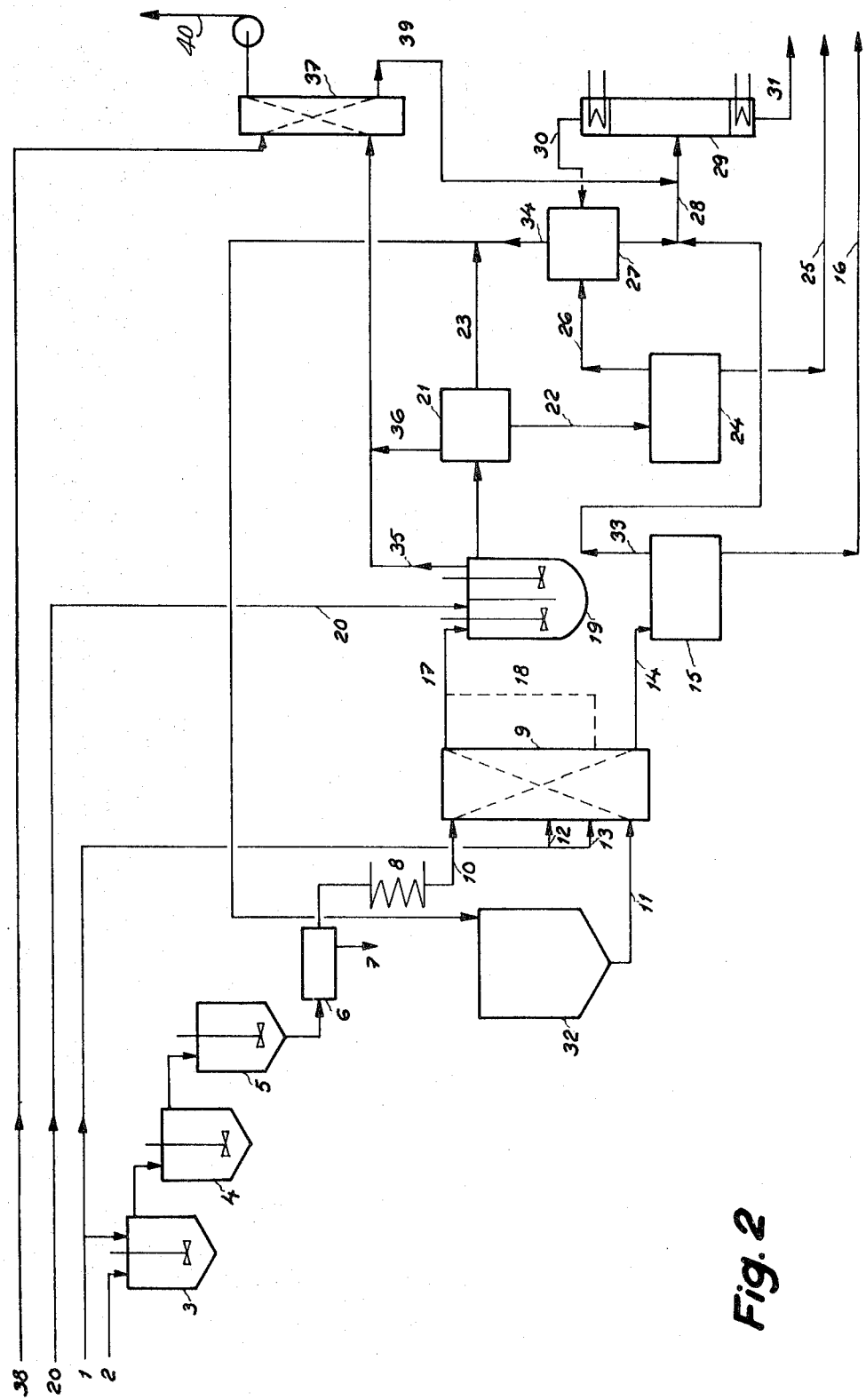
FIG. 2 is a corresponding flowsheet of the method of the invention and embodying a slightly modified recovery system for the solvent.

The system shown in FIG. 2 is for the greater part identical with that of FIG. 1 and corresponding details have been designated with the same reference numerals as in FIG. 1. The system also operates substantially in the same manner as described in connection with FIG. 1, with the exception that the azeotropic mixture 33 obtained upon evaporating the extracted aqueous phase in evaporator 15 is fed to the fractionating column 29 instead of to the settler 27.

Furthermore, the gases escaping from the reactor 19 and the settler 21 respectively which contain solvent vapors are fed via conduits 35 and 36 respectively to a washing column 37 where the gases are washed countercurrently with water supplied through conduit 38. The solvent dissolved in the water is fed from the bottom of column 37 via conduit 39 to the fractionating column 29, and the gases from the top of the washing column are released via conduit 40.

For the purpose of illustrating the invention the following examples are given:

EXAMPLE 1

In a system in accordance with FIG. 1, 7.2 kg. of Kola apatite (52 percent CaO, 38.5 percent $P_2O_5$) was decomposed with 17.2 kg. of 58 percent $HNO_3$ in the reactors 3, 4, 5. After the filtration of insoluble and cooling to the extraction temperature the solution was fed to the extraction column 9 where it was extracted with 50.5 kg. of organic solution (butanol and 8.5 percent water). During the extraction 3.4 kg. of 55 percent $HNO_3$ was continuously added into the middle portion and bottom of the extraction column respectively. From the base of the column 18.7 kg. of extracted aqueous phase and from the top of the column 59.2 kg. of extract phase were discharged. The composition of the extract phase was: 0.5 kg. of $Ca(NO_3)_2$, 3.6 kg. of $H_3PO_4$, 3.7 kg. of $HNO_3$, 5.8 kg. of $H_2O$ and 45.4 kg. of butanol. The extracted aqueous phase contained 0.8 kg. of butanol. After the extract phase was neutralized with 1.9 kg. of gaseous ammonia and fed to the settler 21, the 47.8 kg. of organic solution (butanol and water 7 percent) and the 13.3 kg. of "salt" phase (the composition of which was ammonium phosphate, ammonium nitrate, water, butanol and some calcium phosphate), were separated from each other. From the butanol-stripping systems 15 and 24 respectively 1.20 kg. and 1.55 kg. azeotropic butanol respectively were fed to the settler 27 where two phases were formed; a butanol phase containing 24 percent of water and a water phase containing 6.5 percent of butanol. The water phase was fed to the fractional distillation column 29 from where the azeotropic butanol was returned to the separator 27. Four hundred grams of water was discharged from the base of the column 29.

Straightforward stoichiometric calculation will show that the quantity of nitric acid used in this example for dissolving the phosphate mineral Kola apatite amounted to an excess of about 18 percent. The amount of $HNO_3$ used in the following examples was also substantially in excess of that required, and the percentage of excess $HNO_3$ can be readily calculated.

12.5 kg. of calcium nitrate, having a total nitrate content of 15.2 percent, was obtained from the calcium nitrate solution 16. "Salt" solution 25 was evaporated and granulated to fertilizer. 9.8 kg. of N-P fertilizer were obtained, having a composition of total N 24.5% and $P_2O_5$ 25.0% and having more than 90 percent of its phosphate value in the water-soluble form.

44.3 kg. or 96 percent of the organic solution (butanol) was recycled after "mechanical" separation to the reservoir 32 and after "mechanical" separation, stripping and distillation more than 99 percent of butanol was returned to the reservoir 32 to be re-used in the process.

EXAMPLE 2

The system shown in FIG. 2 was used in this example. The abbreviation "t-AmOH" as used throughout means tertiary amyl alcohol, and "AmOH" means simply amyl alcohol.

After the filtration of insoluble matter and after cooling to the extraction temperature 726 kg. of the solution having the composition: $Ca(NO_3)_2$ 49.2%, $H_3PO_4$ 13.6%, $HNO_3$ 0.5% and $H_2O$ 36.6% was fed to the extraction column 9 and extracted with 2,132 kg. of organic solution (t-AmOH, water 7% and $NH_4NO_3$ 1%). During the extraction 94 kg. of 54% $HNO_3$ was continuously added to the middle section and bottom of the extraction column. From the base of the column 627 kg. of extracted aqueous phase was obtained having the composition: $Ca(NO_3)_2$ 47.1%, $Ca_2(HPO_4)_2$ 47.1%, $Ca_2(HPO_4)_2$ 1.1%, $H_3PO_4$ 2.4%, $NH_4NO_3$ 3.2%, $H_2O$ 41.3% and t-AmOH 4.9% and 2,385 kg. of extract phase having the composition: $Ca(NO_3)_2$ 1.9%, $H_3PO_4$ 3.3%, $HNO_3$ 4.0%, $H_2O$ 8.7% and t-AmOH 81.4%.

The extract phase was neutralized with 43 kg. of gaseous ammonia. From the settler 21 2,015 kg. of regenerated organic solution, having composition: t-AmOH 92.1%, $H_2O$ 6.9% and $NH_4NO_3$ 1%, was returned via conduit 23 to the solvent reservoir 32 and 370 kg. "salt" phase (the composition of which was ammonium phosphate, ammonium nitrate, some calcium phosphate and 18.7% of t-AmOH) was fed to the solvent evaporator 24. From the evaporator 24 95 kg. of azeotropic distillate was fed to the settler 27 where two phases were formed: a t-AmOH phase containing 21 percent of water and a water phase containing 7 percent of t-AmOH. One hundred ten kg. of water solution containing 28 percent of t-AmOH from the evaporator 15, 13 kg. of water phase from the settler 27 and 150 kg. of solvent-containing water (t-AmOH 1.3%) from the washing column 39 were fed to the fractionating column 29. From the bottom of the column 29 226 kg. of water residue and from the top 47 kg. of azeotropic distillate were discharged. Two thousand and fifteen kg. of the organic solvent containing 92.1% of t-AmOH from the settler 21 and 130 Kg. from the settler 27 containing 79.5 percent of t-AmOH were returned to the solvent reservoir 32. The solvent made up into the system after extraction was only 5 kg.

Two hundred and fifty-five kg. of N-P fertilizer were obtained upon further processing the "salt" solution 25. The N-P fertilizer had a composition of total N 23.0% and $P_2O_5$ 20.9% and having 85 percent of its phosphate value in the water soluble form. After neutralization with gaseous ammonia the calcium nitrate solution 16 was evaporated and granulated to calcium nitrate (K.S.) fertilizer. Three hundred and eighty-seven kg. of K.S. fertilizer were obtained having total nitrogen 15.7 percent.

EXAMPLE 3

Into 240 kg. of "salt" solution 23 having the composition: $NH_4H_2PO_4$ 14.5%, $(NH_4)_2HPO_4$ 16.7%, $Ca_2(HPO_4)_2$ 6.8%, $NH_4NO_3$ 47.1% and $H_2O$ 14.8% was added 87 kg. of 60% KCl. The slurry was granulated into a N-P-K fertilizer. Two hundred and ninety-six kg. of N-P-K fertilizer were obtained having the composition: total nitrogen 17.6%, $P_2O_5$ 17.4% and $K_2O$ 17.6%.

I claim:

1. A method of preparing mixed fertilizers comprising dissolving a phosphate material containing calcium phosphate in an excess of concentrated nitric acid, extracting the solution obtained with an organic solvent selected from the group consisting essentially of butyl alcohol and tertiary amyl alcohol, said solvent having limited miscibility and forming an azeotropic mixture with water, to form an extracted aqueous phase containing mainly calcium nitrate and an organic extract phase containing mainly free nitric and phosphoric acids, adding nitric acid to the solution continuously during said step of extracting in amounts sufficient to minimize the formation of calcium phosphate, neutralizing said extract phase with gaseous ammonia to form an initial organic solvent phase and a salt phase containing water-soluble nitrate and phosphate, separating said salt phase from said initial solvent phase, evaporating residual organic solvent from said salt phase in the form of an azeotropic mixture, separating said azeotropic mixture into its components for recovering said residual organic solvent, recirculating the initial organic solvent phase and said residual organic solvent for effecting extraction of additional solution obtained by nitric acid treatment of calcium phosphate containing material, and treating said salt phase for producing a dry nitrophosphate fertilizer.

2. A method as in claim 1, and further comprising evaporating residual organic solvent from said extracted aqueous phase in the form of an azeotropic mixture, separating said azeotropic mixture into its components, and recirculating the organic solvent along with the initial organic solvent phase and residual organic solvent for effecting further extraction.